US006594305B1

(12) United States Patent
Roeck et al.

(10) Patent No.: US 6,594,305 B1
(45) Date of Patent: Jul. 15, 2003

(54) MEDIA ACCESS LAYER PING PROTOCOL FOR DIAGNOSING CABLE MODEM LINKS

(75) Inventors: Guenter E. Roeck, San Jose, CA (US); Wei-Sing Chen, Fremont, CA (US); Sunil Khaunte, Santa Clara, CA (US); Mark E. Millet, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/339,067

(22) Filed: Jun. 23, 1999

Related U.S. Application Data

(63) Continuation-in-part of application No. 09/107,837, filed on Jun. 30, 1998.

(51) Int. Cl.[7] .................................................. H04B 1/38
(52) U.S. Cl. ........................ 375/222; 370/245; 370/450; 725/111
(58) Field of Search ................................ 375/222, 220, 375/224; 370/244, 245, 449, 453, 457, 460, 450; 725/111, 107

(56) References Cited

U.S. PATENT DOCUMENTS

| | | | | |
|---|---|---|---|---|
| 5,815,794 A | * | 9/1998 | Williams | ..................... 725/125 |
| 5,862,451 A | | 1/1999 | Grau et al. | |
| 5,867,500 A | * | 2/1999 | Dolman et al. | .......... 370/395.4 |
| 5,943,604 A | | 8/1999 | Chen et al. | |
| 6,453,472 B1 | * | 9/2002 | Leano et al. | ................. 725/111 |

\* cited by examiner

Primary Examiner—Stephen Chin
Assistant Examiner—Kevin Kim
(74) Attorney, Agent, or Firm—Beyer Weaver & Thomas, LLP

(57) ABSTRACT

Methods, apparatus, and computer-readable media are disclosed for performing diagnostic tests of a communication link between a headend and a cable modem without having to assign an IP address to the cable modem. The diagnostic tests are performed at the MAC layer and test the state of the hardware between and including the cable modem termination system (CMTS) and a selected cable modem. By doing so, a network operator is able to more easily focus in on a potential problem in cable RF/MAC connectivity between the two components by first eliminating (or identifying) a problem with hardware before focusing on problem-solving at the software level, typically at the Network layer, at which point the cable modem is assigned an IP address. A network command is received from a network operator causing the CMTS to place a service identifier corresponding to a cable modem in possible need of diagnosing into a poll list. The service identifier is placed in the poll list the number of times specified in the network command as the number of polls desired for the test. This causes the cable modem to receive a map message with a station maintenance time slot for itself from the CMTS the specified number of times. Periodic ranging is performed between the CMTS and the cable modem associated with the service identifier. If it is determined that the service identifier is in the poll list as a result of the network command, results are then evaluated from the periodic ranging and reported to the network operator as a DOCSIS ping success/failure. It is then determined whether the cable modem should remain on the poll list based on results from the periodic ranging.

18 Claims, 9 Drawing Sheets

MEDIA ACCESS LAYER PING PROTOCOL FOR DIAGNOSING CABLE MODEM LINKS

CROSS-REFERENCE TO RELATED APPLICATIONS

The present application is a continuation-in-part of application Ser. No. 09/107,837 filed Jun. 30, 1998, entitled METHOD AND APPARATUS FOR LOCATING A FAULTY COMPONENT IN A CABLE TELEVISION SYSTEM HAVING CABLE MODEMS, the disclosure of which is incorporated by reference herein.

BACKGROUND OF THE INVENTION

1. Field of the Invention

The present invention relates generally to the transmission of data in cable television network systems. More specifically, the present invention relates to methods and apparatuses for rapidly determining whether a link in a network system utilizing cable modems is operational regardless of a modem's registration status.

2. Discussion of Related Art

Since the late 1980's the cable TV industry has been upgrading its signal distribution and transmission infrastructure. In many cable television markets, the infrastructure and topology of cable systems now include fiber optics as part of its signal transmission component. The use of fiber optics has accelerated the pace at which the cable industry has taken advantage of the inherent two-way communication capability of cable systems. The cable industry is now poised to develop reliable and efficient two-way transmission of digital data over its cable lines at speeds orders of magnitude faster than those available through telephone lines, thereby allowing its subscribers to access digital data for uses ranging from Internet access to cable commuting. While cable TV systems have always had the ability to send data downstream, i.e. from a cable TV hub, described below, to cable modems in people's homes, cable TV systems can now send data upstream, i.e. from individual cable modems to a hub. This new upstream data transmission capability enabled cable companies to use set-top cable boxes and provided subscribers with "pay-per-view" functionality, i.e. a service allowing subscribers to send a signal to the cable system indicating that they want to see a certain program.

FIG. 1 is a block diagram of a two-way hybrid fiber-coaxial (HFC) cable system including cable modems and a network management station. The main distribution component of an HFC cable system is a primary (or secondary) hub 102 (also referred to as a "headend") which can typically service about 40,000 subscribers or end-users. Hub 102 contains several components of which two, relevant to this discussion, are shown in FIG. 1. One component is a cable modem termination system or, CMTS, 104 needed when transmitting data (sending it downstream to users) and receiving data (receiving upstream data originating from users) using cable modems, shown as boxes 106, 108, 110, and 112. Another component is a fiber transceiver 114 used to convert electrical signals to optical signals for transmission over a fiber optic cable 116. Fiber optic cable 116 can typically run for as long as 100 km and is used to carry data (in one direction) for most of the distance between hub 102 to a neighborhood cable TV plant 117. More specifically, fiber optic cable 116 is a pair of cables—each one carrying data in one direction. When the data reaches a particular neighborhood cable TV plant 117, a fiber node 118 converts the data so that it can be transmitted as electrical signals over a conventional coaxial cable 120, also referred to as a trunk line. Hub 102 can typically support up to 80 fiber nodes and each fiber node can support up to 500 or more subscribers. Thus, there are normally multiple fiber optic cables emanating from hub 102 to an equal number of fiber nodes. In addition, the number of subscribers as well as fiber capacity is currently increasing due to dense wave-division multiplexing technology. DWDM is a technique for transmitting on more than one wavelength of light on the same fiber.

The primary functions of CMTS 104 are (1) interfacing to a two-way data communications network; (2) providing appropriate media access control or MAC level packet headers (described below) for data on the RF interface of a cable system; and (3) modulating and demodulating the data to and from the cable system.

Cable TV (CTV) taps 122 and 124 are used to distribute a data signal to individual cable modems 106 and 110 (from CTV tap 124) and modems 108 and 112 (from CTV tap 122). Two-way cable TV amplifiers 126 and 128 are used to amplify signals as they are carried over coaxial cable 120. Data can be received by the cable modems shown (each CTV tap can have output cables servicing multiple cable modems) and transmitted back to hub 102. In cable systems, digital data is carried over radio frequency (RF) carrier signals. Cable modems are devices that employ modulation for transmission on a broadband media and demodulation to recover digital data from a modulated RF carrier which it receives. This modulation/demodulation is done at two points: by a cable modem at the subscriber's home and by CMTS 104 located at hub 102. If CMTS 104 receives digital data, for example from the Internet, it converts the digital data to a modulated RF signal which is carried over the fiber and coaxial lines to the subscriber premises. A cable modem then demodulates the RF signal and feeds the digital data to a computer (not shown). On the return path, the operations are reversed. The digital data is fed to the cable modem which converts it to a modulated RF signal. Once CMTS 104 receives the RF signal, it demodulates it and transmits the digital data to an external source.

Data packets are addressed to specific modems or to a hub (if sent upstream) by a MAC layer 130 in CMTS 104 at hub 102 (there is also a MAC addressing component, not shown, in the cable modems that encapsulate data with a header containing the address of the hub when data is being sent upstream). CMTS 104 has a physical layer 132 that is partly responsible for keeping a list of modem addresses and encapsulating data with appropriate address of its destination. MAC layer 130 receives data packets from a Data Network Interface (not shown) in hub 102. The main purpose of MAC layer 130 is to encapsulate a data packet within a MAC header according to the DOCSIS standard for transmission of data. DOCSIS is an interim standard establishing the protocol for two-way communication of digital data on cable systems defined and adopted by a consortium of industry groups, and is well known in the field of cable modem data communication. MAC layer 130 contains the necessary logic to encapsulate data with the appropriate MAC addresses of the cable modems on the system. Each cable modem on the system has its own MAC address.

Whenever a new cable modem is installed, its address must be registered with MAC layer 130. The MAC address is necessary to distinguish data going from the cable modems since all modems share a common upstream path, and so that CMTS 104 knows where to send data. Thus, data packets, regardless of format, must be mapped to a particular MAC address. MAC layer 130 is also responsible for sending out polling messages as part of the link protocol between the CMTS and the cable modems that is necessary to maintain a communication connection between the two. In addition, cable modems transmit range request (RNG-REQ) messages to the headend as part of the link protocol between the CMTS and the cable modems.

In conventional cable television network systems, polling messages used as part of the link protocol between the CMTS and the cable modems necessary to maintain a communication connection between the two are sent between Network layers of the CMTS and the CABLE MODEM. That is, polling is conducted as a Network (or IP) layer protocol, for example the ICMP echo protocol utilizing an ICMP ping process. In order for the CMTS to communicate with a cable modem at the Network level, the modem's IP address must be known. IP addresses are assigned to cable modems as part of a registration process, typically performed when a cable TV subscriber opens an account. This has the disadvantage that polling communication between a CMTS and a cable modem may not be possible before a cable modem is registered. Thus, the integrity of a cable network system may not be determined unless all of its cable modems have been registered.

Further, conventional Network layer polling protocols are typically limited to a regular transmission schedule. This is due to the fact that time division multiplexing (TDM) is used in upstream communication between cable modems and the CMTS in a cable system. The CMTS provides a time slot map for TDM to the cable modems. One slot in the TDM is a "station maintenance" time slot (SMTS). Each cable modem receives at least one SMTS every 30 seconds. When a cable modem receives a SMTS it must transmit a RNG-REQ message which is used by the CMTS in order to determine if the cable modem is operational and to maintain the link to that cable modem. If the cable modem does not respond to the SMTS after 16 tries the cable modem is assumed to be off. This arrangement limits the timing of feedback that may be obtained from cable modems in a cable system. Another restriction in the protocol is that the cable modem must receive an opportunity to transmit on the upstream within 30 seconds otherwise the modem itself disconnects. Generally, the same constraints of TDM apply to the ping DOCSIS protocol utilized for communication between the CMTS MAC layer and the cable modem MAC layer.

Because of the increasing usefulness of cable modems for transmitting data over existing cable TV systems, cable modems are proliferating. As they become more prevalent, the burden of maintaining a cable TV plant having a network of cable modems increases. Specifically, the problem of tracking down and isolating a problematic device or group of devices has become increasingly difficult.

Therefore, it would be desirable for a CMTS to be able to poll cable modems in a cable TV network system by issuing a network command at any time in order to determine whether a link in a network system utilizing cable modems is operational, regardless of the registration status of or the state of software in the modems in the network. It would further be desirable if the polling protocol were able to provide information regarding the nature and location of any problems that prevent polling communication between a CMTS and a cable modem.

SUMMARY OF THE INVENTION

According to the present invention, methods, apparatus, and computer program products are disclosed for evaluating a communication link between a cable modem termination system and a cable modem. In one aspect of the invention, a method of examining connectivity status between a cable modem termination system (CMTS) and one or more cable modems is described. A network command is received from a network operator causing the CMTS to place a service identifier (SID) corresponding to a cable modem in possible need of diagnosing into a poll list. The service identifier is placed in the poll list the number of times specified in the network command as the number of polls desired for the test. This causes the cable modem to receive a map message with a periodic ranging time slot for itself the specified number of times. Periodic ranging is performed between the CMTS and the cable modem associated with the service identifier. If it is determined that the service identifier is in the poll list as a result of the network command, results are then evaluated from the periodic ranging. It is then determined whether the cable modem should remain on the poll list based on results from the periodic ranging.

In one embodiment, the network command entered is a ping DOCSIS command that specifies a particular number of polls to be taken between the CMTS and a cable modem. In another embodiment, the network command forces the entry of the cable modem into a poll list which is normally caused based on the expiration of a periodic timer. In another embodiment, it is determined whether the CMTS has received a polling message, such as a range request, from the cable modem and, if so, whether any modem parameter adjustments are needed. In yet another embodiment, a failure is reported to a network operator if the CMTS has not received the polling message from the cable modem and reporting a success if it has. In yet another embodiment, whether a cable modem identifier is in the poll list as a result of a network command is determined by checking a ping pending list that contains only those identifiers associated with a network command, the network command being a ping DOCSIS command.

In another aspect of the invention a method of checking on demand the quality of a communication link between a cable modem and a cable modem termination system, or CMTS, in the headend using MAC layer functionality is described. A ping command specifying a cable modem to be diagnosed is entered by a network operator and accepted by the CMTS. It is not required that the cable modem have an assigned IP address. It is then determined whether the cable modem is on a poll list as a result of the ping command or from normal periodic ranging, such as from the expiration of a periodic timer. Results from the ping command are evaluated and it is determined whether parameter adjustments for the cable modem upstream transmitter are needed or whether the modem should be taken offline. The ping command is executed using primarily MAC layer functionality.

In one embodiment it is determined whether the CMTS has received a range request from the cable modem. If the range request is satisfactory to the CMTS, a range response is transmitted to the cable modem and a poll success is reported. If the range request is unsatisfactory to the CMTS, a poll failure is reported. In another embodiment, an executed polls counter maintained for each modem being tested is incremented each time the cable modem is put on the poll list thereby forcing periodic maintenance by the CMTS. The cable modem is inserted into the poll list once the ping DOCSIS command is accepted by the CMTS.

In yet another aspect of the invention a cable modem termination system (CMTS) configured to perform initial and periodic ranging with a network of cable modems, and capable of accepting a forced periodic ranging command is described. The CMTS contains a poll list or cable modem table for storing a list of cable modem service identifiers, known as SIDs, wherein a SID is inserted into the poll list through either the expiration of a periodic ranging timer or through the issuance of a ping command that forces the periodic ranging of the cable modem specified in the ping command. The CMTS also contains a list of cable modems (SIDs) for which a poll or "ping" is pending. Thus, each SID in this ping pending list is associated with a particular ping command. The CMTS also maintains an executed polls counter associated with a particular cable modem for keeping track of the number of times the modem associated with a ping command, which typically specifies the number of polls desired, is placed in the poll list.

BRIEF DESCRIPTION OF THE DRAWINGS

The invention will be better understood by reference to the following description taken in conjunction with the accompanying drawings in which.

DETAILED DESCRIPTION

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

A method of detecting the source of a connectivity problem between a cable modem and a CMTS using Media Access Control (MAC) protocol functionality is described in the various figures. By using a ping process (referred to as ping DOCSIS, described below) in the MAC layer instead of, for example, an ICMP ping in the network or IP layer, the status of the cable (HFC) network can be checked autonomously. This status can be checked without the network layer being active. Furthermore, such a ping DOCSIS command can be entered by a network operator on demand. One problem with using the ICMP ping is that cable modem software can go into an undefined state making it difficult to interpret results from an ICMP ping. Furthermore, an ICMP ping will fail if the network layer is not active. Another drawback of ICMP ping is that the cable modem must have an IP address and, thus, be registered in the network. By issuing a ping DOCSIS command at the MAC layer, a network operator can easily determine whether there is a hardware connectivity problem. If the ping DOCSIS does not indicate a problem, the source of the problem is very likely with the cable modem software, at which point an ICMP ping can be performed. DOCSIS is an interim standard establishing the protocol for two-way communication of digital data on cable systems defined and adopted by a consortium of industry groups, and is well known in the field of cable modem data communication.

Polling messages behave as heartbeats from cable modems telling a CMTS that the cable modem is still enabled or "alive." A CMTS instructs all cable modems it supports when to send it a polling message. Once every 30 seconds, the CMTS issues a SMTS to every modem on the network, soliciting a polling message (described below) from the modem. Once the modem is given a SMTS in the map, it replies in the marked SMTS. During the time slot indicated in the SMTS, the CMTS expects to receive a message from a particular cable modem. If the CMTS does not receive a polling message from a cable modem for a threshold number of consecutive time frames (e.g., 16) in which that cable modem should have sent a polling message, the CMTS assumes the connection between the cable modem and CMTS is lost.

Figure 1:
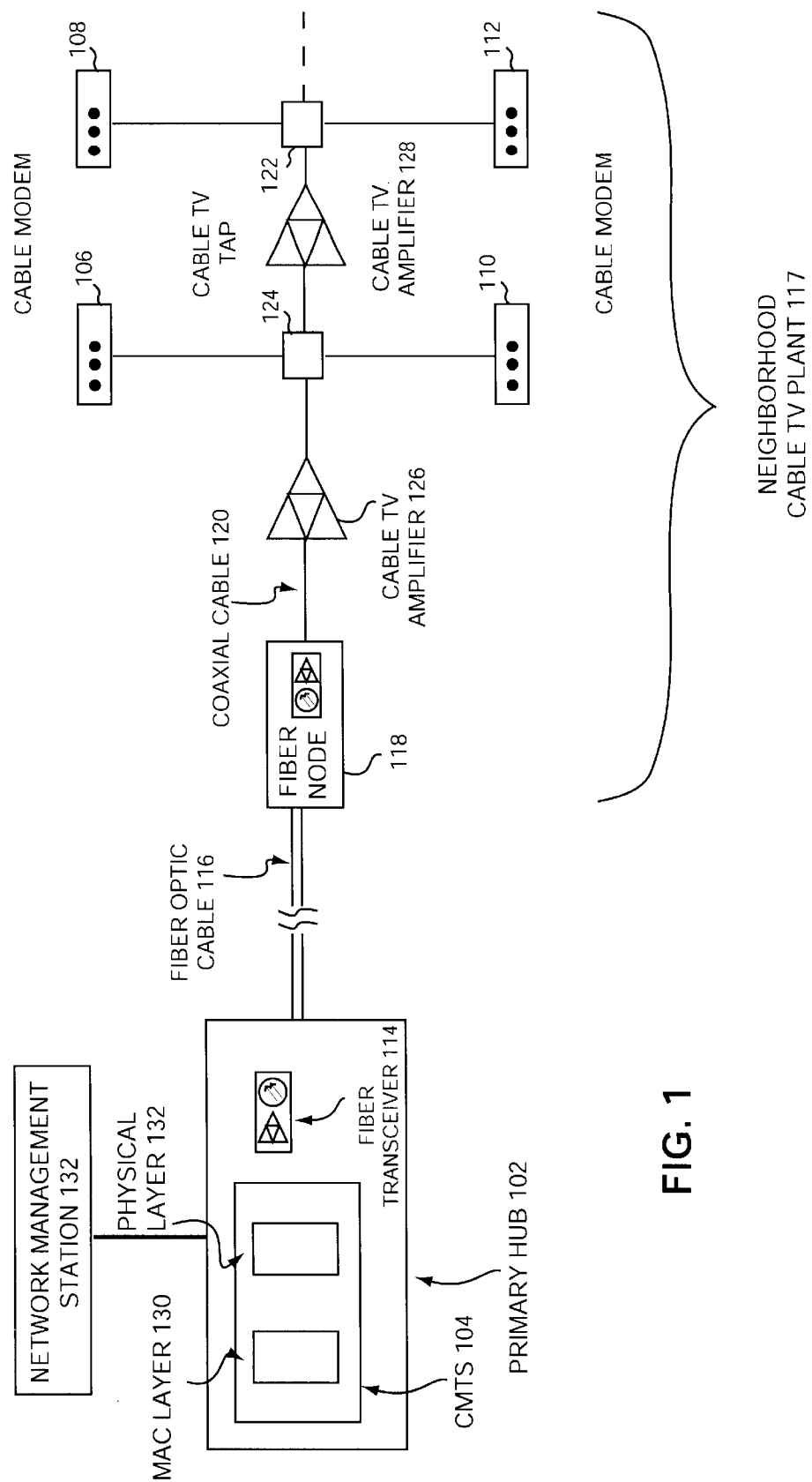
FIG. 1 is a block diagram of a two-way hybrid fiber-coaxial (HFC) cable system including cable modems and a network management station.
Figure 2:
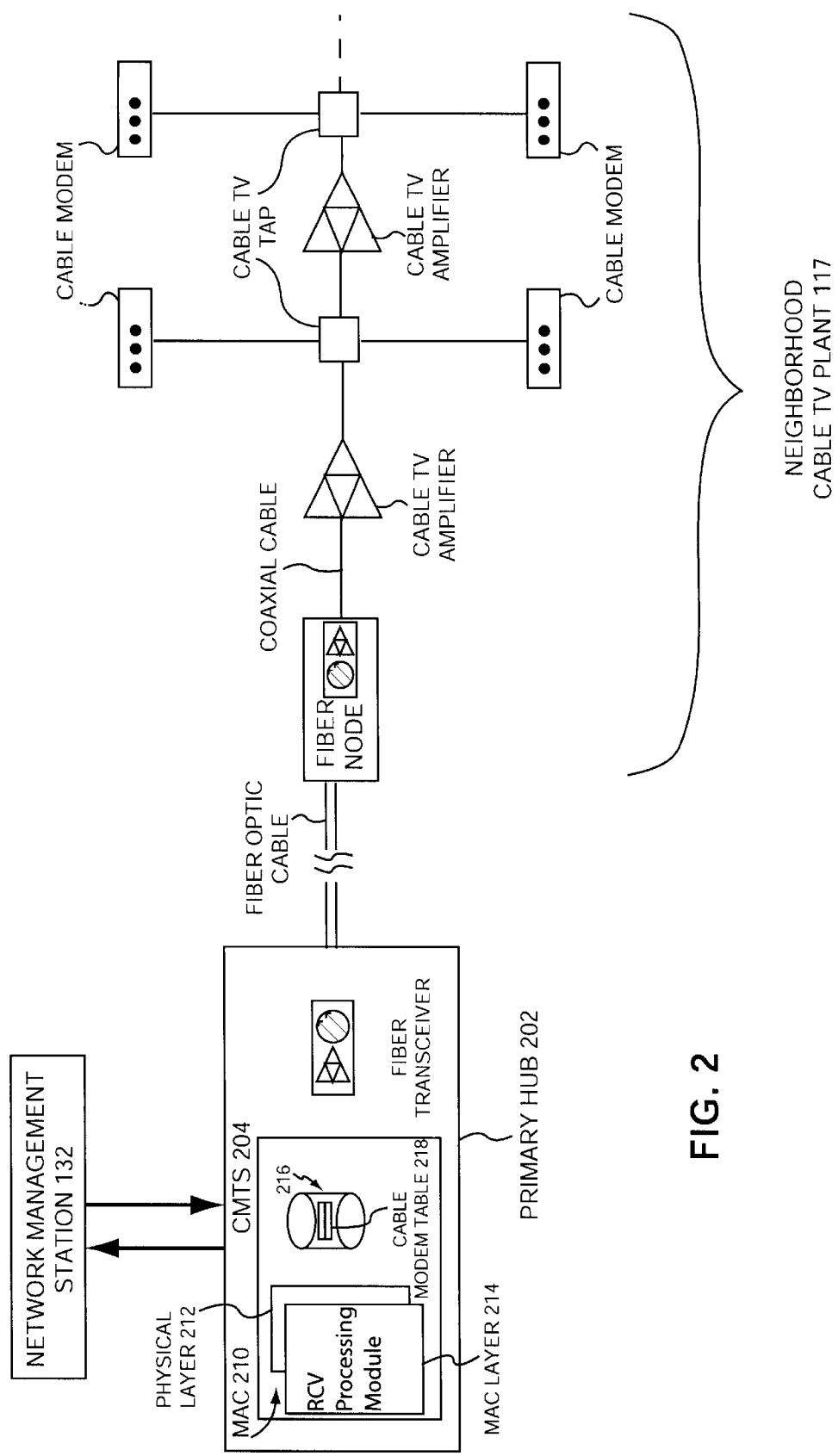
FIG. 2 is a block diagram showing components in a neighborhood cable TV plant and in a CMTS in accordance with one embodiment of the present invention.

FIG. 2 is a block diagram showing components in a neighborhood cable TV plant and in a CMTS in accordance with one embodiment of the present invention. CMTS 204 is shown having a MAC component 210 which encapsulates data packets with a MAC header containing a destination address of a cable modem. One component of CMTS 204 is a physical layer 212 for maintaining a communication link between CMTS 204 and all the cable modems it supports. The CMTS does this by receiving polling messages from cable modems at predetermined times. In the described embodiment, a MAC layer 214 is added on top of physical layer 212. MAC layer 214 implements station maintenance polling (described below) and tabulates the topological performance data needed to monitor the network of cable modems. Also shown is a cable modem table 218, also referred to as a poll list, in a storage area 216. MAC layer 214 contains a processing module referred to as a MAC RCV processing module 220.

In the described embodiment MAC RCV processing module 220 of MAC layer 214 has a variety of functions. As a component of the CMTS, it schedules certain time slots on the upstream channel as an initial maintenance time slot (IMTS) or as a station maintenance time slot (SMTS). An IMTS can be used by any modem (in contention mode) wanting to join the cable network, and getting an entry in cable modem table 218. The cable modem should send an initial maintenance request to the CMTS during a scheduled time slot on the upstream channel. MAC RCV processing module 220 issues a SMTS to those modems that are online indicating to each modem a time interval in which a modem should send to the CMTS a polling message to indicate to the CMTS that the connection to the cable modem is still good. In the described embodiment a polling message is sent from a cable modem to CMTS 204, and specifically the MAC RCV module 220, in the form of a range request (RNG-REQ) message. This is the same type of message that a cable modem sends to a CMTS (during a time interval specified in an initial maintenance message) requesting to be assigned a time interval in which it should send a polling message.

Figure 3A:
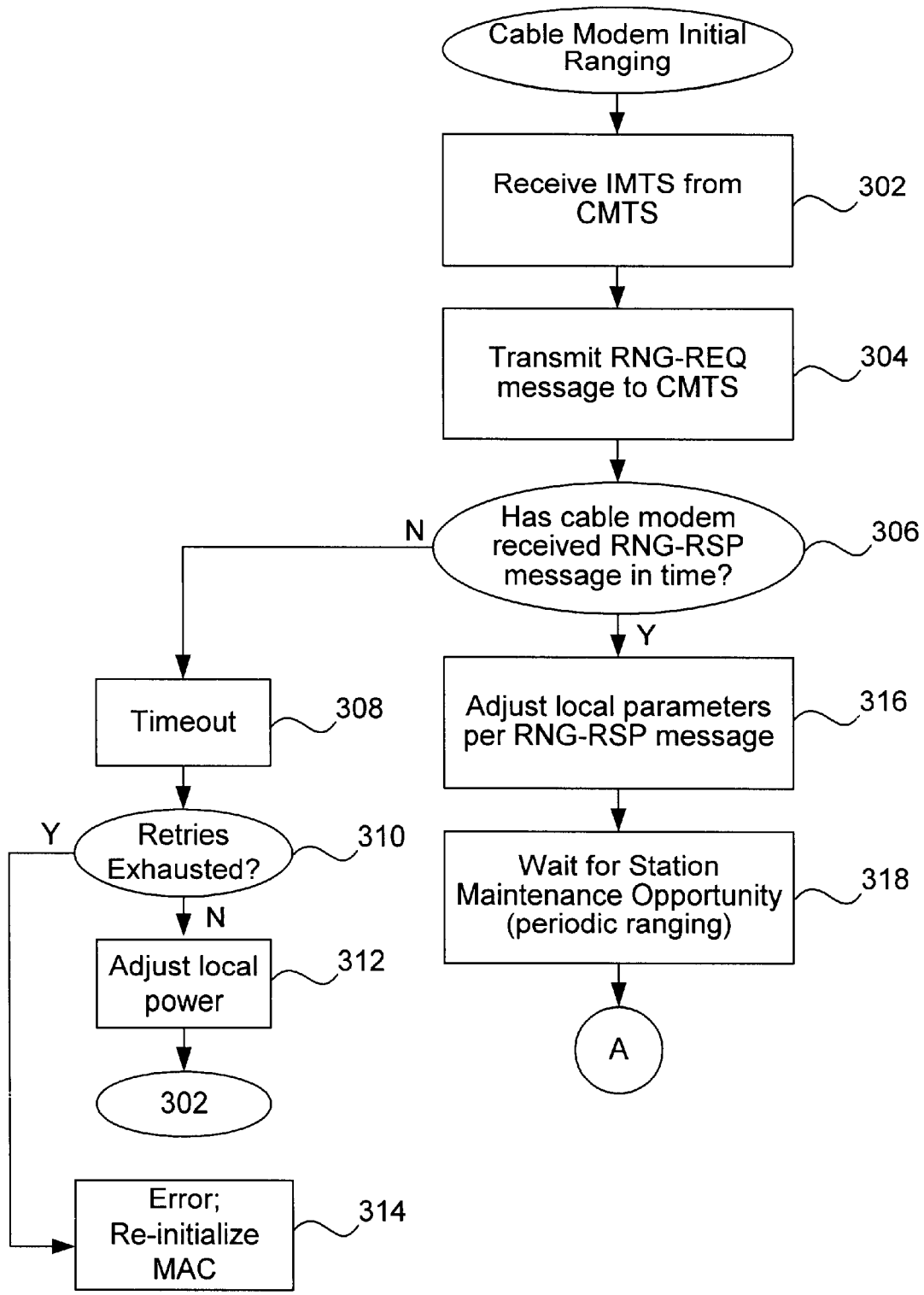
FIGS. 3A and 3B are flow diagrams of an initial ranging process from the perspective of a cable modem in accordance with one embodiment of the present invention.
Figure 3B:
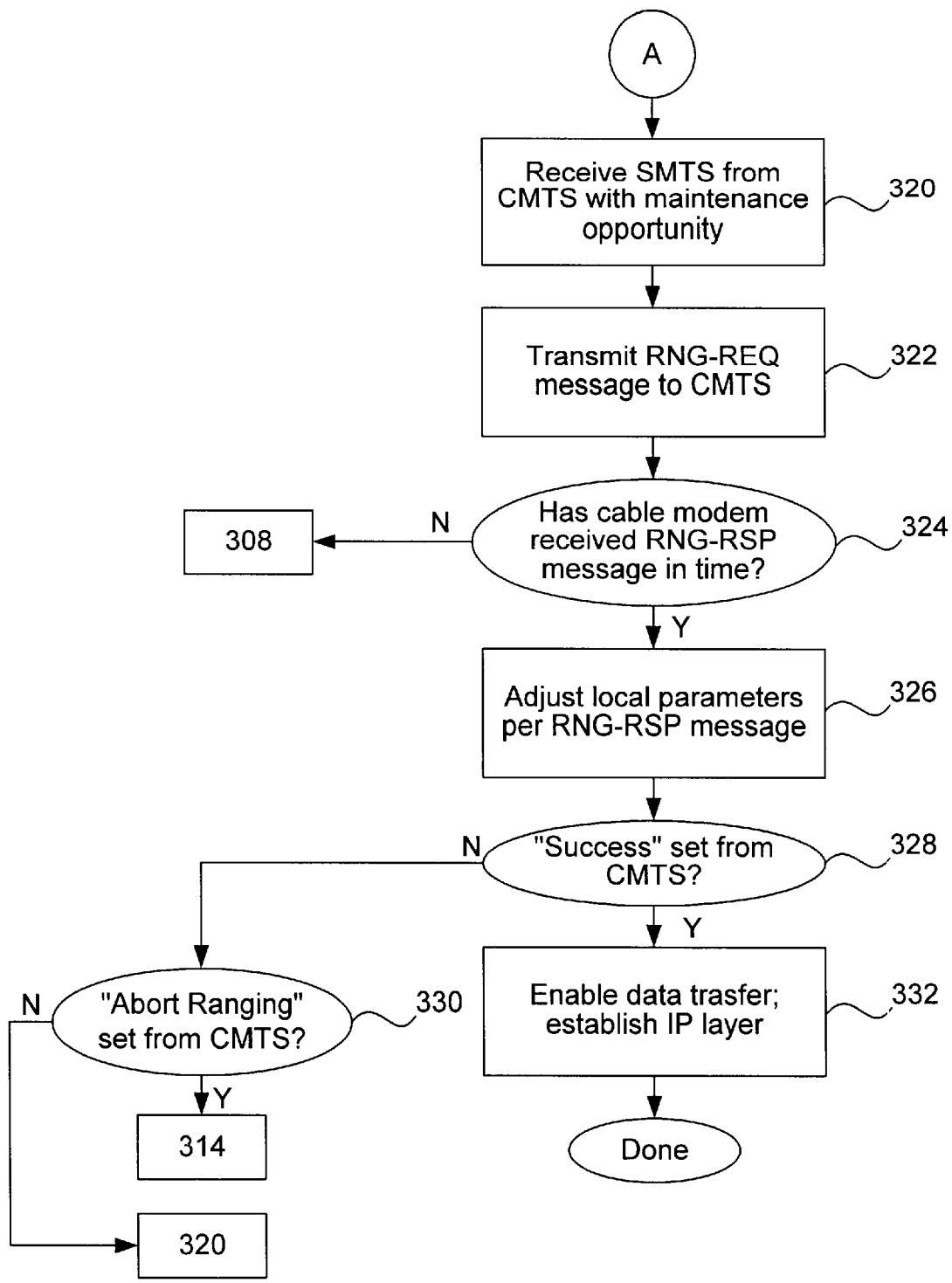

The ping DOCSIS technique of the present invention is implemented using the periodic ranging process of the CMTS. To fully describe the context in which such periodic ranging takes place and, as such, the context of the ping DOCSIS method, an initial ranging process of the CMTS and the cable modem is described. Ping DOCSIS uses these ranging events to obtain information on the connectivity status of a cable modem. FIGS. 3A and 3B are flow diagrams of an initial ranging process from the perspective of a cable modem in accordance with one embodiment of the present invention.

Initial ranging for a cable modem occurs when a cable modem in an operating cable plant is powered on by a user. Once turned on, the cable modem waits for an initial maintenance opportunity from the CMTS. At a step 302 the CMTS schedules time slots on the upstream channel as IMTS so that a modem desiring to come on line can do so (i.e., it has an initial maintenance opportunity). A map message contains, among other data, SMTSs which are time-division multiplexing (TDM) assignment slots in which the cable modem can transmit a RNG-REQ MAC message. Typically, an IMTS is in the range of two milliseconds. Every time slot in the map message has a SID and a length of time slot (i.e., the length of time the IMTS is valid). A SID is a number between 1 and 8191 which maps data service class attributes to a modem's MAC address. Every modem (MAC address) has a primary SID used for MAC message connectivity with the CMTS.

At a step 304 the cable modem transmits an initial RNG-REQ message to the CMTS upon receiving the map message. An initial RNG-REQ essentially informs the CMTS that the modem wants to establish connectivity with the headend. It includes the modem's MAC address and message type. At a step 306 the cable modem determines whether a RNG-RSP message from the CMTS has been received within a predetermined time period such as 200 milliseconds. A RNG-RSP message contains data for adjusting and configuring a cable modem. If a RNG-RSP is not received in time, a timeout occurs at a step 308. A timeout can also occur if RNG-REQ messages from multiple modems collide on the upstream channel to the CMTS. To prevent these modems from repeating or retransmitting their RNG-REQ messages in lockstep, a random backoff is used to prevent reoccurring collisions. A random backoff involves deferring a certain number of initial ranging time slots on the upstream before retrying the initial ranging request. The ranging window specified in the map message described above is used to determine the backoff value.

At a step 310 the cable modem determines whether a threshold number of retransmissions of RNG-REQ messages to the CMTS has been made. If the number of retransmissions is not over the threshold number and a RNG-REQ message has been transmitted, the cable modem local power level is adjusted and the random backoff described above is performed at a step 312. At this stage the cable modem waits for an initial maintenance opportunity and control returns to step 302. If the number of retries exceeds the threshold number, the cable modem is in an error state and a MAC reinitialization is performed at a step 314. Details on operations performed by a cable modem in the event of this timeout (and the timeouts described below) are described in greater detail in "Data-Over-Cable Service Interface Specifications: Radio Frequency Interface Specification (SP-RFI-104-980724)" by Cable Television Laboratories, Inc., 1997 (Interim Specification), incorporated by reference in its entirety herein.

Returning to step 306, if the cable modem receives a RNG-RSP message within the allowable time limit, certain local parameters of the cable modem are adjusted as instructed in the message at a step 316. In the described embodiment, the non-receipt of a RNG-RSP message can also result in the adjustment of certain local parameters. The three primary adjustments are local power level offset, timing offset, and a frequency adjustment. All adjustments and parameters must be within an approved range for the cable modem at all times. With respect to power adjustments, such adjustments should start from a minimum value unless a valid power is available from non-volatile storage, in which case this must be used as a starting power level. In addition, power adjustments must be capable of being reduced or increased by the amount specified in the RNG-RSP message. At a step 318 the cable modem waits for a station maintenance opportunity. At this stage the initial ranging for the cable modem continues. The maintenance opportunity is specifically for one cable modem or "station," as described in FIG. 3B. The first several steps in the station maintenance are similar to the initial steps performed for the initial maintenance.

At a step 320 the cable modem receives a map message from the CMTS for another maintenance opportunity. The map message contains the same type of data as described in step 302 of FIG. 3A. If the cable modem does not receive the map message within a predetermined time period, a timeout occurs. Operations performed upon timeouts are not relevant to the present invention and are well known in the field of cable data communication and, thus, are not shown in the flow diagram (for details on timeout conditions, refer to the Interface Specification reference above). At a step 322 the cable modem transmits a RNG-REQ message to the CMTS as described in step 304. At a step 324 the cable modem determines whether it has received a RNG-RSP message from the CMTS within an allowable time period as it did in step 306. If it does not receive an appropriate message in time, a timeout occurs as described in step 308 and subsequent steps.

If the cable modem does receive a RNG-RSP message as expected, control goes to step 326 where the cable modem local parameters are adjusted according to instructions in the RNG-RSP message. These include the same parameters described in step 316: power level offset, timing offset, and frequency adjustments. Another adjustment may be needed since adjustments made initially may no longer be accurate. For example, the CMTS might initially request a power level adjustment of 20 dB. The modem adjusts to what it believes is 20 dB. However, because power and frequency measurements in the modem are not calibrated, the modem may make an adjustment of 18 dB. The CMTS then has to repeat the process to request another adjustment of 2 dB, which is performed at step 326. At a step 328 the cable modem determines whether a flag indicating that the RNG-REQ from the modem is within the tolerance of the CMTS has been set. If so, the RNG-REQ message is considered to have succeeded. Examples of factors to determine whether the RNG-REQ is within the tolerances of the CMTS include power level, frequency, and timing. This flag, as well as others set by the CMTS, is discussed in FIGS. 4A and 4B below.

If the "success" flag is not set by the CMTS, the cable modem determines whether an "abort ranging" flag has been set indicating that the initial ranging of the cable modem should be terminated at a step 330. If the ranging request is outside any of the CMTS tolerances and the abort flag has been set, the cable modem is placed in an error state and a MAC reinitialization is performed as in step 314. If the abort flag has not been set, the modem waits for a station maintenance opportunity and control returns to step 320. If the "success" flag is set by the CMTS, the cable modem establishes IP connectivity to enable actual data transfer at step 332. The cable modem invokes DHCP mechanisms in order to obtain an IP address and any other parameters needed to establish IP connectivity. At this stage the initial ranging process from the perspective of a cable modem is complete.

Figure 4A:
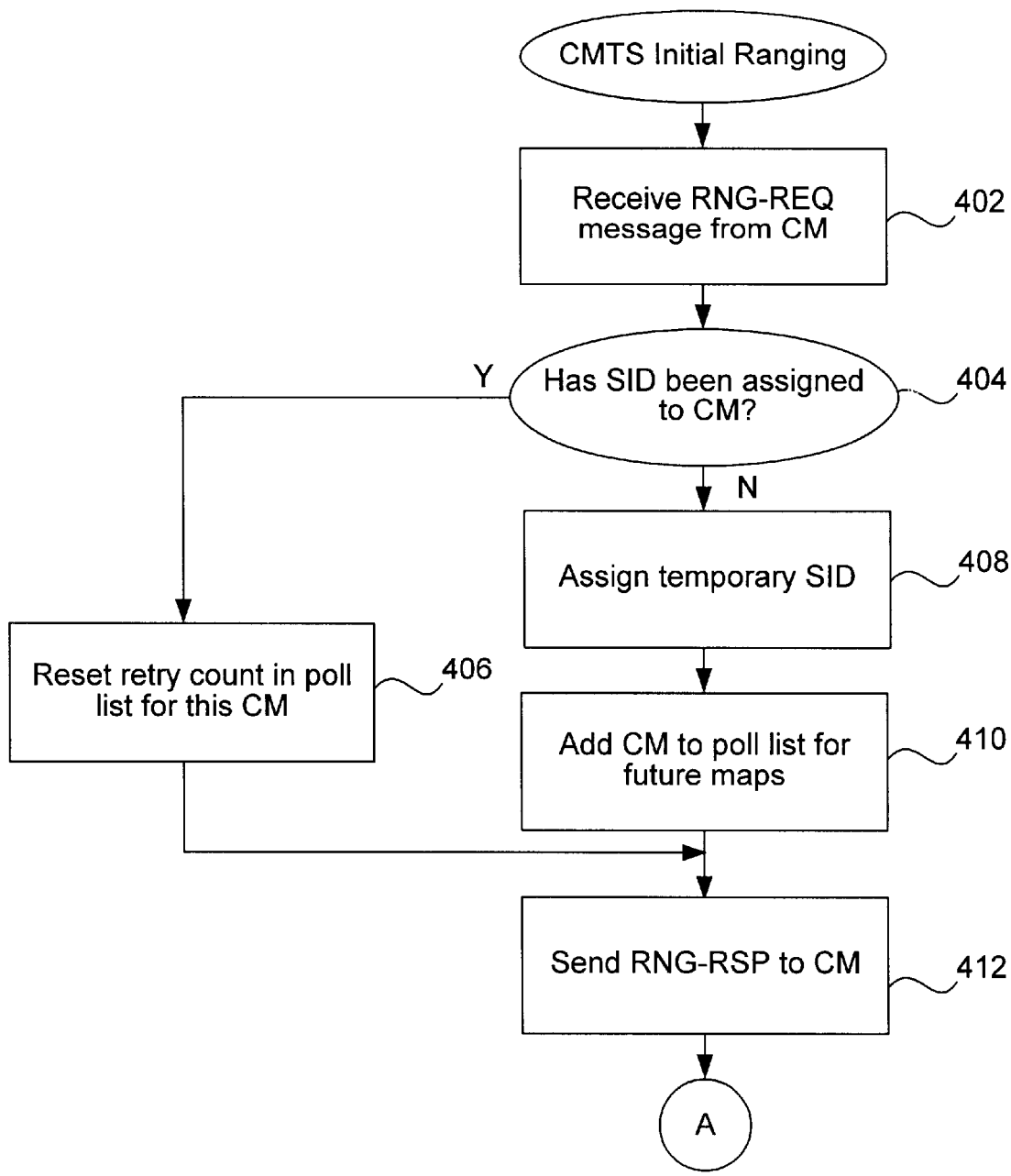
FIGS. 4A and 4B are flow diagrams of a process of initial ranging from the perspective of the CMTS in accordance with one embodiment of the present invention.
Figure 4B:
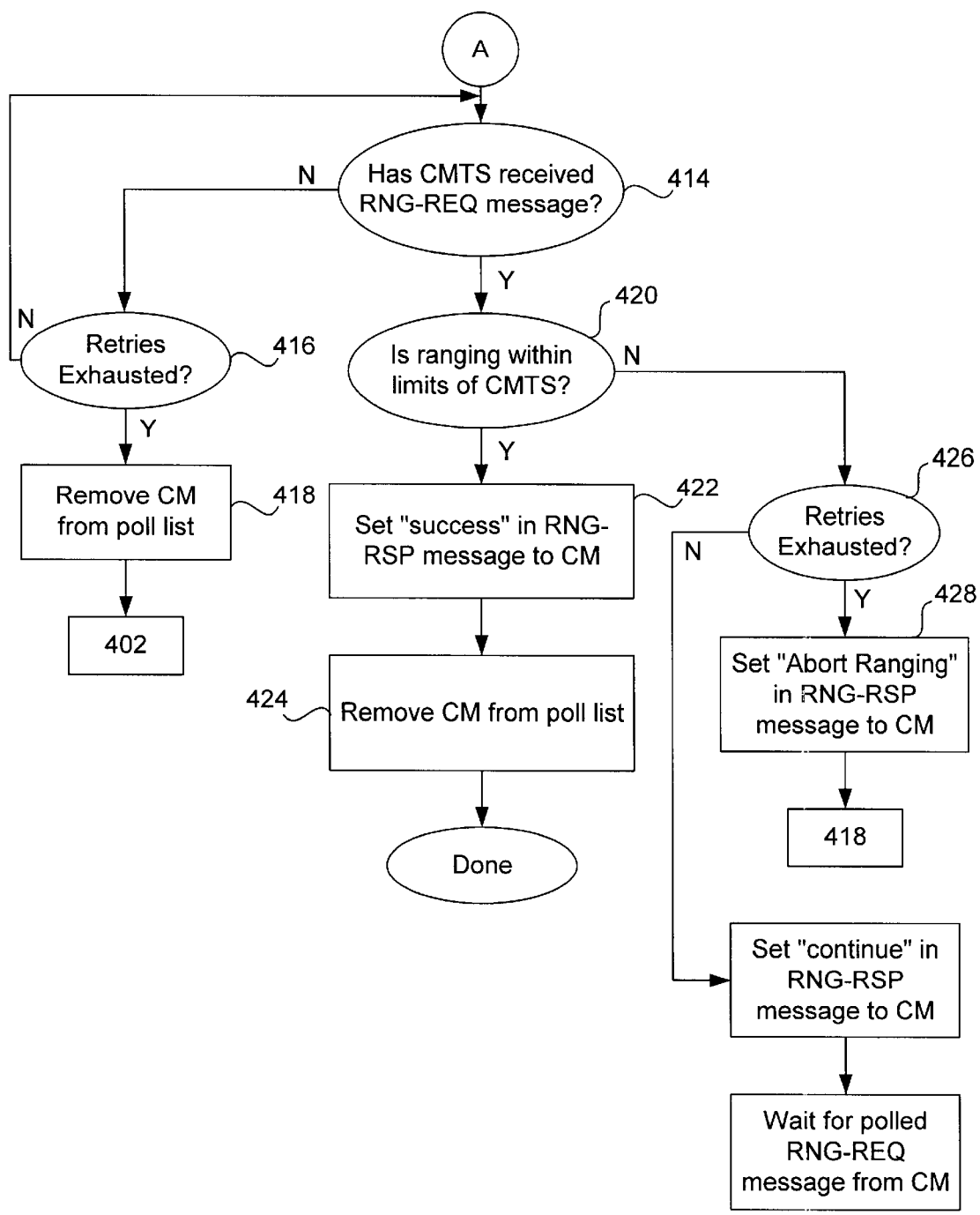

FIGS. 4A and 4B are flow diagrams of a process of initial ranging from the perspective of the CMTS in accordance with one embodiment of the present invention. It is important to note that there is one initial ranging process. FIGS. 3A and 3B describe the process from the view of the cable modem; FIGS. 4A and 4B show the same process from the view of the CMTS. Thus, many of the steps below are closely tied to steps described in FIGS. 3A and 3B in that they depict operations performed by the CMTS for the same actions. At a step 402 the CMTS receives a RNG-REQ message from the cable modem as described in step 304 of FIG. 3A.

At a step 404 the CMTS determines whether a SID has been assigned to the cable modem by checking a cable modem table or poll list maintained by the CMTS. A poll list is an internal data structure containing a list of cable modem SIDs for modems in the station maintenance handling state and which need to be polled by sending a RNG-RSP message or other appropriate message type that the cable modem might need. If one has been assigned, control goes to a step 406 where a "retry" count corresponding to the modem's SID is reset to zero. If a SID was not previously assigned, one is assigned to the modem at a step 408. At a step 410 the cable modem is added to the poll list to ensure that it subsequently receives map messages as needed. At a step 412 a RNG-RSP message is transmitted to the cable modem. This step is also performed after step 406 when the modem's retry counter is reset.

At a step 414 of FIG. 4B the CMTS determines whether it has received a RNG-REQ message from the cable modem. If it has not received a RNG-REQ message within an allotted time period, control goes to a step 416 where the CMTS determines whether the number of subsequent attempts at receiving a RNG-REQ message from the modem has exceeded a threshold value. The CMTS provides ranging opportunities to the modem until the number exceeds the threshold or maximum number allowed. If the threshold is not exceeded, control returns to step 414. If the number of retries has reached the threshold number, it is likely that the modem has been turned off or a problem exists with the modem and its SID is removed from the poll list so it will not receive future map messages at a step 418.

Returning to step 414, if the CMTS has received a RNG-REQ message, it determines whether ranging parameters such as power level and timing offsets and frequency adjustments are within acceptable limits to the CMTS at a step 420. If they are the "success" flag in a RNG-RSP message is transmitted to the cable modem as described above in FIGS. 3A and 3B at a step 422. At this stage the cable modem is removed from the poll list at a step 424 since the modem has now established connectivity with the CMTS and begins transmitting actual data. If the ranging parameters are not within the CMTS limits, the CMTS determines whether the number of subsequent RNG-REQ messages that were not within the ranging parameters of the CMTS exceeds a threshold number at a step 426. If the number of retries has exceeded the threshold value, control goes to a step 428 where an "abort ranging" flag is set in a RNG-RSP message transmitted to the cable modem. This informs the cable modem to temporarily discontinue ranging due to problems in the cable plant or with the cable modem not being able to achieve acceptable ranging parameters. The cable modem is then removed from the poll list at step 424 at which point the initial ranging process is complete.

Figure 5A:
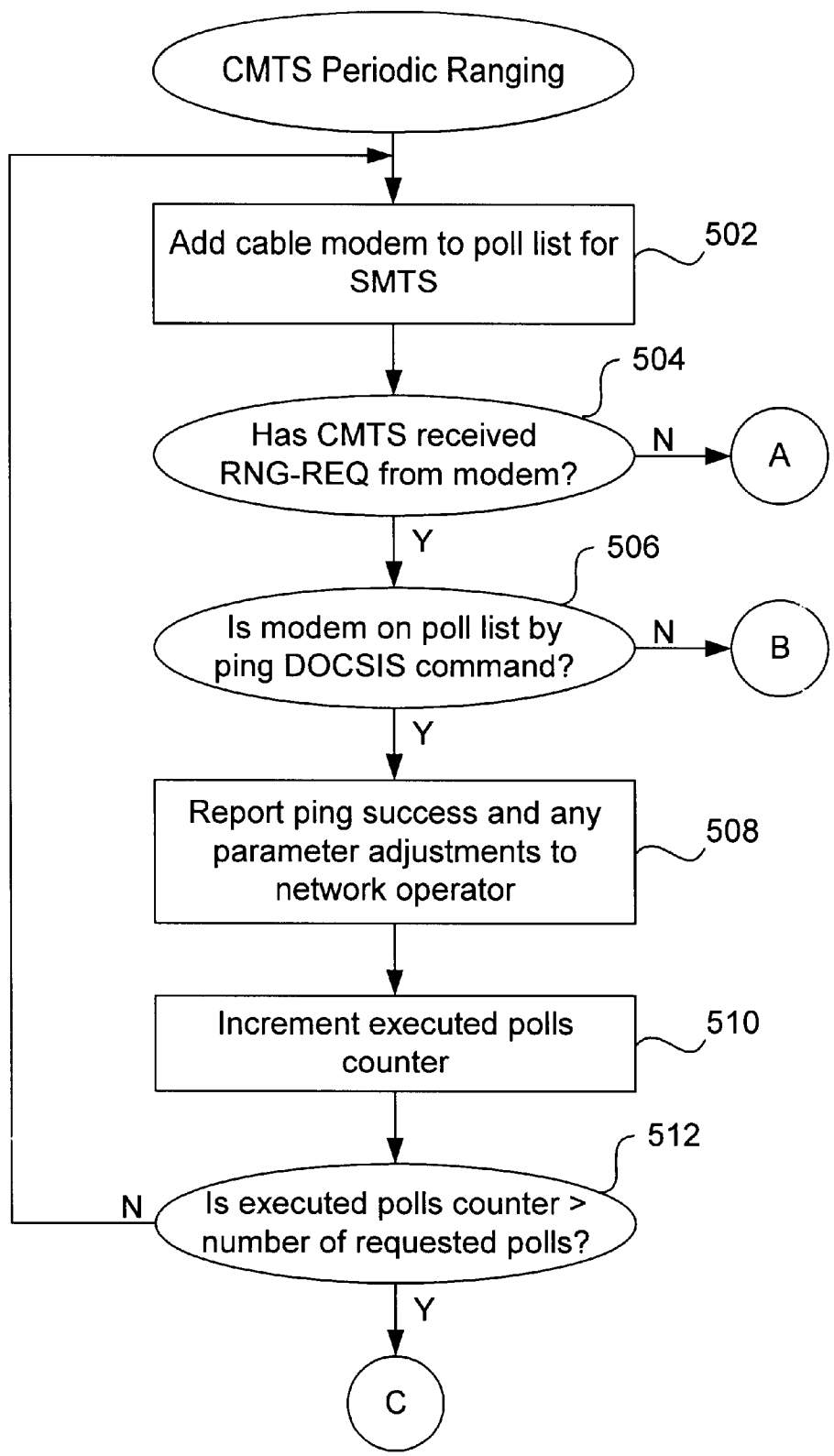
FIGS. 5A, 5B, and 5C are flow diagrams describing a process for periodic ranging as viewed from the CMTS in accordance with one embodiment of the present invention.
Figure 5B:
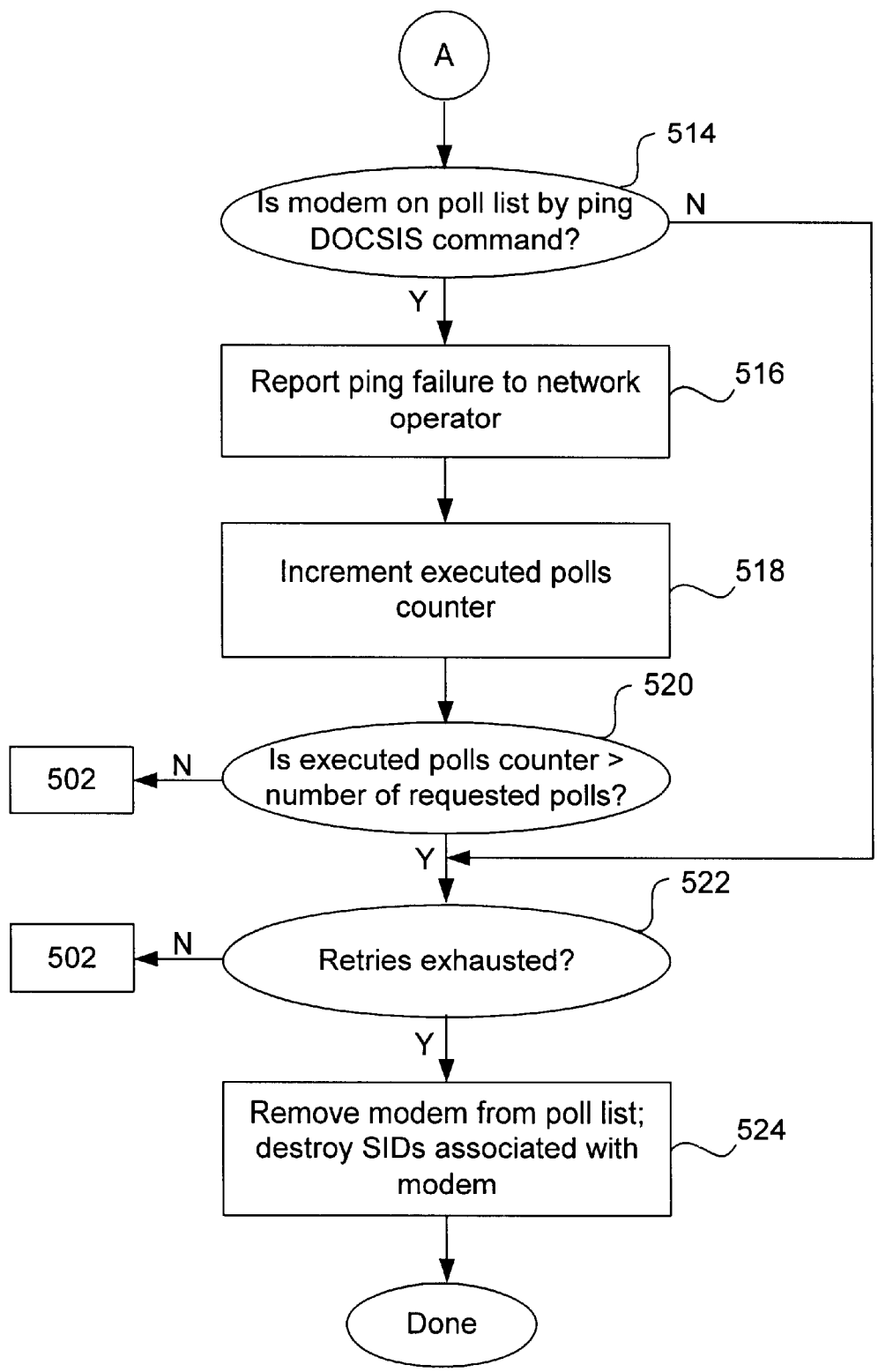
Figure 5C:
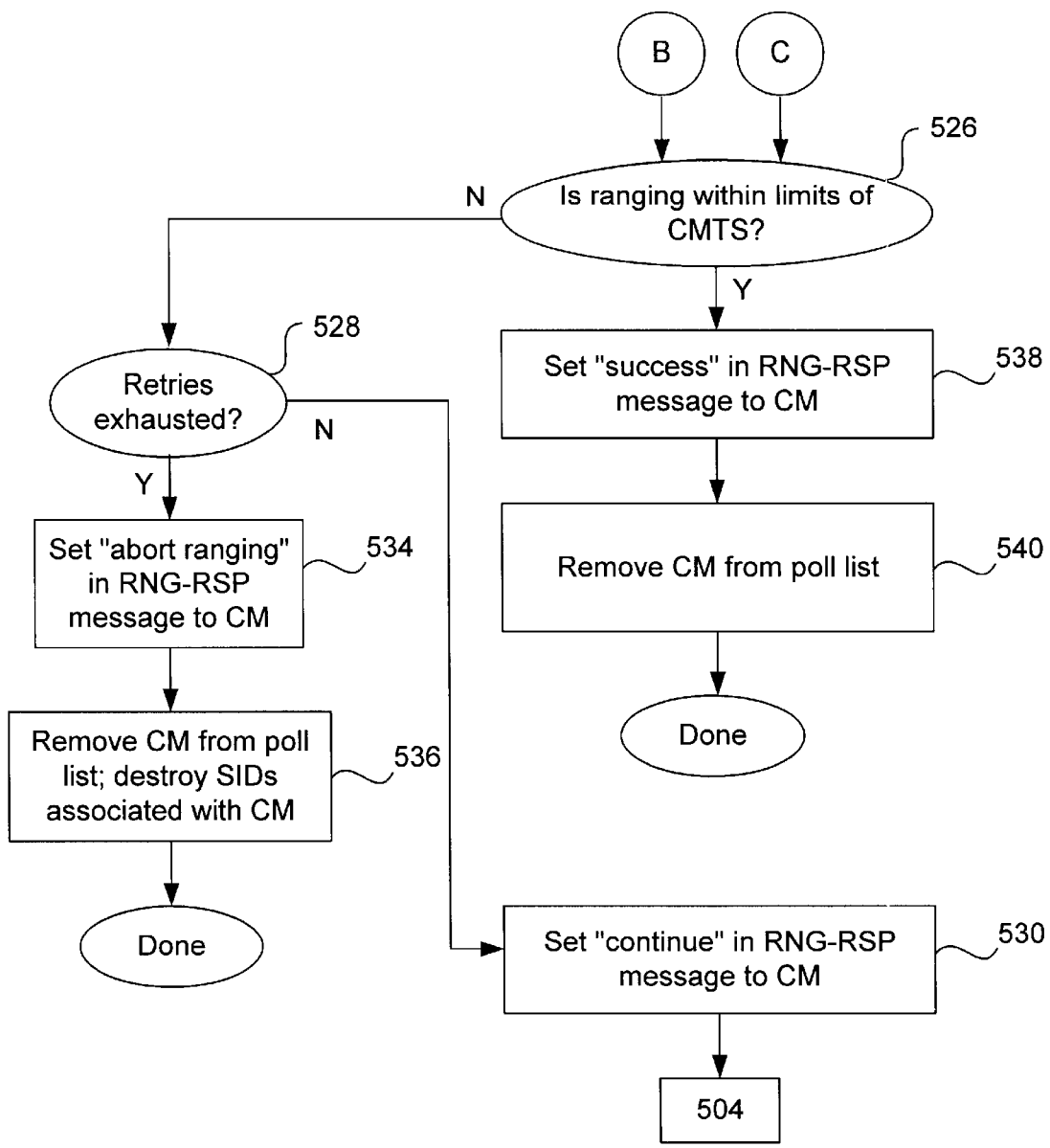

FIGS. 5A, 5B and 5C are flow diagrams describing a process for periodic ranging as viewed from the CMTS in accordance with one embodiment of the present invention. Periodic ranging is performed once initial ranging is complete and the cable modem has established communication with the headend. According to the Radio Frequency Interface specification, the CMTS must provide each cable modem with a Periodic Ranging opportunity at least once during a predetermined time interval. In the described embodiment the time interval is at least every 30 seconds. The specification also requires that the CMTS send out Periodic Ranging opportunities at an interval sufficiently shorter than the predetermined time period (e.g., every 30 seconds) so that a map message can be missed without the cable modem timing out.

At a step 502 a cable modem is added to a poll list to receive future map messages based one of two events: a periodic timer reaching a particular time or receiving a ping DOCSIS command issued by an operator. A cable operator issues a ping DOCSIS command to determine whether a problem exists in the HFC network or possibly with a specific cable modem. At a step 504 the CMTS determines whether a RNG-REQ message has been received from a cable modem similar to step 414 of FIG. 4B. If a RNG-REQ message has been received, control goes to a step 506 where the CMTS determines whether the modem is on a poll list for future map messages through a ping DOCSIS command. As mentioned above, a network operator (e.g., cable TV plant operator or a third-party under its direction) can enter a ping DOCSIS command to essentially perform a hardware test of the cable plant and modem using the MAC layer. By entering such a command, the operator forces the entry of a the cable modem into a poll list for station maintenance instead of relying on the normal periodic timer for putting the modem in the poll list. In the described embodiment, the CMTS is able to determine whether a cable modem is in the poll list because of normal polling (periodic maintenance) or from a ping DOCSIS command through the use of a "ping pending" list. Once a ping DOCSIS command has been entered, the number of executed polls in modem's poll counter is initialized to zero. The modem is then entered into a ranging poll list so that the MAC scheduler can schedule a SMTS for the modem. The modem is also added to a ping pending list so that the ping process can take appropriate action (e.g., notify operator, reinsert next ping poll), in case the modem does not successfully respond with a RNG-REQ in its SMTS. In another embodiment, software in the CMTS knows that a SID is in the ranging poll list from the network operator entering a ping DOCSIS command via a command line interface (or by other means, such as SNMP) or from normal periodic polling.

If the modem is in the poll list as a result of a ping DOCSIS command, the CMTS informs the network operator (typically via a computer monitor at a network operation center) that the ping command was successful since a RNG-REQ message was received from the cable modem (determination made at step 504). The CMTS also reports any necessary ranging adjustments with respect to power, timing, and frequency, among other factors, for the cable modem at a step 508. Thus, even though the ping was successful, significant and frequent ranging adjustments can still indicate problems with the cable plant or modem, or at least the need for occasional maintenance. For example, a ping command requesting a 100 polls can result in 95 successful pings. However, 55 out of those 95 successful pings may have indicated power adjustments requiring some action by the network operator.

At a step 510 the CMTS increments a counter keeping track of the number of executed polls resulting from a ping command. When a modem is selected for testing and a ping DOCSIS command is issued, an executed polls counter is created for the testing of that particular modem. A ping command typically requests that a number of individual pings be performed; that is, that the modem be placed in the poll list a certain number of times. The number typically ranges from 10 to a 100 individual pings. After a ping is executed, the counter corresponding to the modem being tested is incremented. At a step 512 the CMTS determines whether the number of executed polls for a ping DOCSIS commands has reached the number requested polls in the command. If not, control returns to step 502 where the cable modem is inserted into the poll list for a map message and the process is repeated.

Returning to step 504, if the CMTS has not received a RNG-REQ message from the cable modem, control goes to a step 514 of FIG. 5B. As in step 506, the CMTS determines whether the modem is on the poll list as a result of a ping DOCSIS command and not from the expiration of a periodic timer. Because a RNG-REQ message was not received from the cable modem as determined at step 504, the poll executed is considered to have failed. Thus, at a step 516 the ping failure is reported to the network operator. The executed polls counter is incremented at a step 518. The CMTS then determines whether, as in step 512, the number of executed polls is greater than the number of polls requested in the particular ping command at a step 520. If not, control returns to step 502 of FIG. 5A. If the requested number of polls has been reached, at a step 522 the CMTS determines whether the number of reattempts has reached a threshold value as described in steps 310 of FIG. 3A and 416 of FIG. 4B. If the number of retries has reached the threshold value, control returns to step 502 so the MAC scheduler can reinsert (retry) the SMTS before waiting in step 504. The process then continues from step 504.

If the number of reattempts has reached the threshold value and ping failures are still occurring (as would be the case if the process has reached step 522), at a step 524 the cable modem is removed from the poll list and its SIDs are deleted from the system. If the process reaches this step, there is very likely a problem with the cable modem and the network operator can proceed with identifying the failure, at which point the periodic ranging for the cable modem is complete in this context (i.e., ping failures).

Returning to steps 506 and 512 of FIG. 5A, other contexts in which periodic ranging is performed are described in FIG. 5C. At step 506, if the modem is on the poll list for normal periodic maintenance determined by a periodic timer (and not because of a ping DOCSIS command), control goes to step 526 of FIG. 5C. Similarly, at step 512, if the number of executed polls has reached the number of pings requested in a ping DOCSIS command, control goes to step 526. Thus, the periodic ranging process resuming at step 526 is the portion of the process that would normally occur if the ping DOCSIS command feature were not available and, as such, is well known in the field of data over cable communications.

At a step 526 the CMTS determines whether ranging parameters such as power level and timing offsets and frequency adjustments are within acceptable limits as was performed at step 420 of FIG. 4B. If the ranging parameters are not within the limits of the CMTS, control goes to step 528 where the CMTS determines whether the number of reattempts has reached a threshold number as was done at step 522. If not, control goes to step 530 where the CMTS sets a "continue" flag (similar to the "success" and "abort" flags mentioned above) in its RNG-RSP message to the cable modem. Upon receiving the RNG-RSP message, the cable modem will continue attempting periodic ranging with the CMTS. The modem is added to the ranging poll list. The process continues with step 504 where the CMTS then waits for a RNG-REQ from the modem in the scheduled SMTS.

Returning to step 528, if the number of retries has reached a threshold number, control goes to a step 534 where the CMTS sets an "abort ranging" flag in its RNG-RSP message to the cable modem thereby instructing the modem to discontinue attempting periodic ranging and to allow time to identify the problem. At a step 536 the cable modem is removed from the poll list and SIDs associated with the modem are erased. At this stage the periodic ranging for the cable modem is terminated. Returning to step 526, if the ranging parameters of the RNG-REQ message from the cable modem are within the limits of the CMTS, control goes to a step 538. The CMTS sets a "success" flag in the RNG-RSP message to the cable modem. At a step 540 the SID associated with the cable modem is removed from the poll list and the periodic ranging is complete.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. For example, although the ping process described is implemented in the DOCSIS standard, the same methodology can be used in other standards. In another example, mechanism other than a ping pending list can be used to distinguish a modem entry in the poll list inserted as a result of a network operator command. Accordingly, the present embodiments are to be considered as illustrative and not restrictive, and the invention is not to be limited to the details given herein, but may be modified within the scope and equivalents of the appended claims.

What is claimed is:

1. A method of examining connectivity status between a cable modem termination system (CMTS) and one or more cable modems, the method comprising:

receiving a network command that causes the CMTS to place a selected identifier associated with a cable modem into a poll list a predetermined number of times thereby causing the cable modem to receive a map message the predetermined number of times;

performing periodic ranging between the CMTS and a cable modem associated with the selected identifier;

if the selected identifier is in the poll list as a result of the network command, evaluating results from the periodic ranging; and determining whether the cable modem should remain on the poll list based on the results from the periodic ranging.

2. A method as recited in claim 1 wherein the network command is a ping DOCSIS command specifying a particular number of pings to be performed between the CMTS and the cable modem.

3. A method as recited in claim 1 wherein receiving a network command forces the entry of the selected identifier associated with a cable modem into the poll list.

4. A method as recited in claim 1 wherein performing periodic ranging further includes:

determining whether the CMTS has received a first polling message from the cable modem; and if a first polling message has been received, determining whether cable modem parameter adjustments are necessary.

5. A method as recited in claim 4 further comprising reporting a failure if the CMTS has not received a first polling message from the cable modem and reporting a success if the CMTS has received a first polling message from the cable modem.

6. A method as recited in claim 4 further comprising incrementing by one an executed polls counter each time the selected identifier is inserted into the poll list as a result of the network command.

7. A method as recited in claim 6 wherein the periodic ranging between the CMTS and a cable modem associated with the selected identifier is performed the predetermined number of times.

8. A method as recited in claim 7 further comprising comparing the executed polls counter with the predetermined number of times.

9. A method as recited in claim 1 wherein determining if the selected identifier is in the poll list as a result of the network command further includes:
   checking a ping pending list containing a plurality of identifiers of cable modems, a network command being associated with each one of the identifiers.

10. A method as recited in claim 1 wherein the map message includes one or more time-division multiplexing assignment slots in which the cable modem can transmit a polling message.

11. A method of spot checking the quality of a communication link between a cable modem and a cable modem termination system (CMTS) using Media Access Layer (MAC) layer functionality, the method comprising:
   accepting a ping command specifying a selected cable modem to be tested wherein it is not required that the selected cable modem have an Internet Protocol (IP) address;
   during periodic ranging, determining whether a cable modem is on a poll list from a ping command;
   evaluating results from the ping command thereby determining whether parameter adjustments for the selected cable modem are needed or whether the selected modem should be taken offline;
   whereby the ping command is executed primarily using MAC layer protocol.

12. A method as recited in claim 11 wherein evaluating results from the ping command further includes:
   determining whether the CMTS has received a range request from the cable modem;
   transmitting a range response to the cable modem if the range request is satisfactory to the CMTS and reporting a ping success;
   reporting a ping failure if the range request is unsatisfactory to the CMTS.

13. A method as recited in claim 11 further comprising:
   incrementing an executed polls counter each time the selected cable modem is put on the poll list thereby forcing periodic maintenance by the CMTS.

14. A method as recited in claim 11 further comprising:
   inserting the selected cable modem into the poll list upon accepting the ping command; and indicating that the selected cable modem is in the poll list as a result of the ping command.

15. A cable modem termination system configured to perform initial ranging and periodic ranging with a network of cable modems comprising:
   a poll list for storing a first plurality of cable modem service identifiers wherein the poll list is arranged to allow insertion of a cable modem service identifier through issuance of a ping command;
   a ping pending list for storing a second plurality of cable modem service identifiers wherein a cable modem service identifier in the ping pending list is associated with a ping command; and
   an executed polls counter for storing a count of the number of times a cable modem associated with a ping command, the ping command having a number of requested polls, is placed in the poll list.

16. A cable modem termination system as recited in claim 15 wherein the first plurality of cable modem service identifiers are inserted in the poll list through one of expiration of a periodic timer and issuance of a ping command.

17. A computer-readable medium containing programmed instructions arranged to examine connectivity status between a cable modem termination system (CMTS) and one or more cable modems, the computer-readable medium including programmed instructions for:
   receiving a network command that causes the CMTS to place a selected identifier associated with a cable modem into a poll list a predetermined number of times thereby causing the cable modem to receive a map message the predetermined number of times;
   performing periodic ranging between the CMTS and a cable modem associated with the selected identifier;
   if the selected identifier is in the poll list as a result of the network command, evaluating results from the periodic ranging; and
   determining whether the cable modem should remain on the poll list based on the results from the periodic ranging.

18. A computer-readable medium containing programmed instructions arranged to spot check the quality of a communication link between a cable modem and a cable modem termination system (CMTS) using Media Access Layer (MAC) layer functionality, the computer-readable medium including programmed instructions for:
   accepting a ping command specifying a selected cable modem to be tested wherein it is not required that the selected cable modem have an Internet Protocol (IP) address;
   during periodic ranging, determining whether a cable modem is on a poll list from a ping command;
   evaluating results from the ping command thereby determining whether parameter adjustments for the selected cable modem are needed or whether the selected modem should be taken offline;
   whereby the ping command is executed primarily using MAC layer protocol.

* * * * *